United States Patent [19]

Ho

[11] Patent Number: 5,013,079
[45] Date of Patent: May 7, 1991

[54] TELESCOPICALLY-OPERATED VEHICLE CANOPY

[76] Inventor: Chao-Chuan Ho, P.O. Box 10160, Taipei, Taiwan

[21] Appl. No.: 441,625

[22] Filed: Nov. 27, 1989

[51] Int. Cl.⁵ .............................................. B60J 11/00
[52] U.S. Cl. ...................................... 296/136; 135/88; 135/102
[58] Field of Search ................... 296/136; 135/88, 102

[56] References Cited

U.S. PATENT DOCUMENTS 2,598,940  6/1952  Robie ................................. 135/88 X

FOREIGN PATENT DOCUMENTS 74422   7/1952  Denmark ........................ 296/136
2380155 9/1978  France ............................ 296/136
56962   9/1944  Netherlands ..................... 135/88

Primary Examiner—Margaret A. Focarino
Assistant Examiner—Andrew C. Pike

[57] ABSTRACT

A telescopically-operated vehicle canopy includes a canopy cloth secured on a plurality of ribs normally retractably stored in a rear bottom portion of a car body, a driving rod pivotally formed on a bottom portion of the car body for operatively extending the ribs and the canopy cloth horizontally outwardly to separate from the car body, and a rotating rod pivotally formed on a middle bottom portion of the car body for operatively extending the canopy cloth upwardly for shielding the car body, serving as a movable "garage" formed in situ in a car.

16 Claims, 5 Drawing Sheets

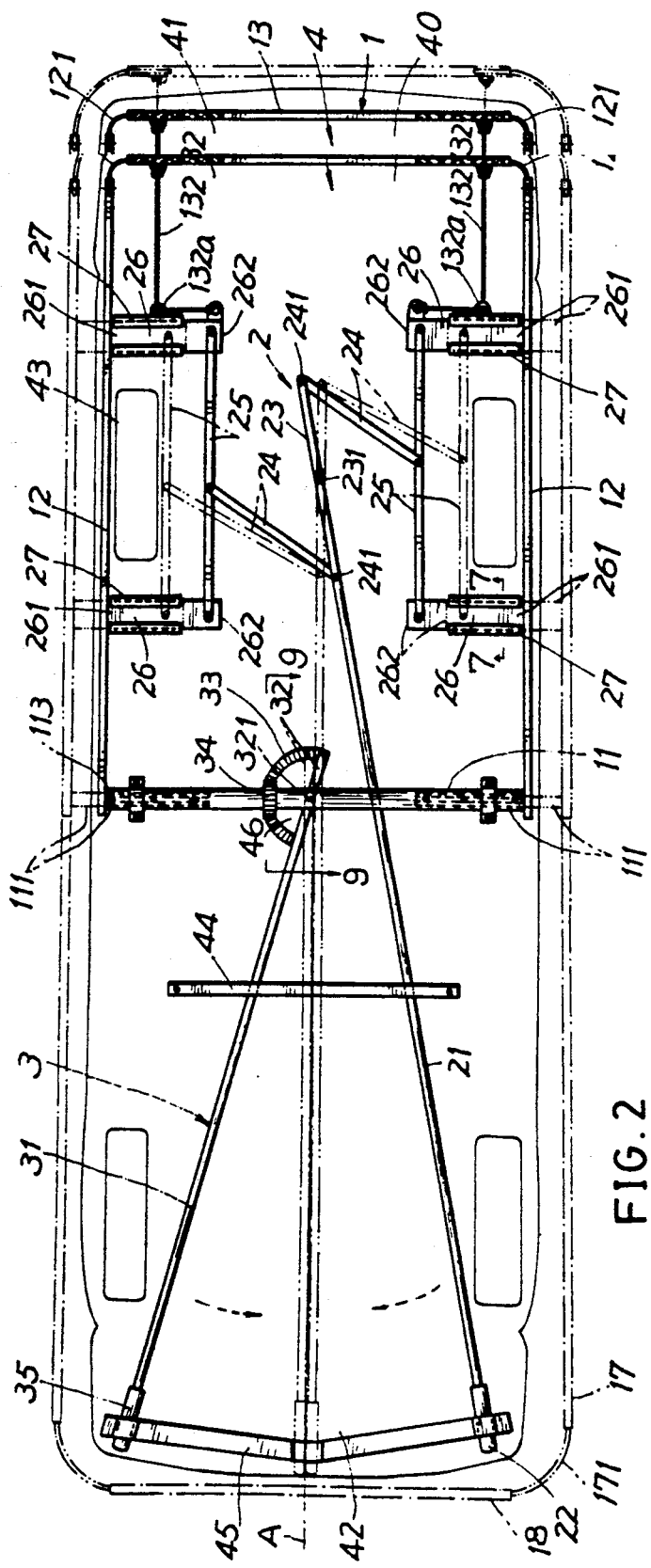
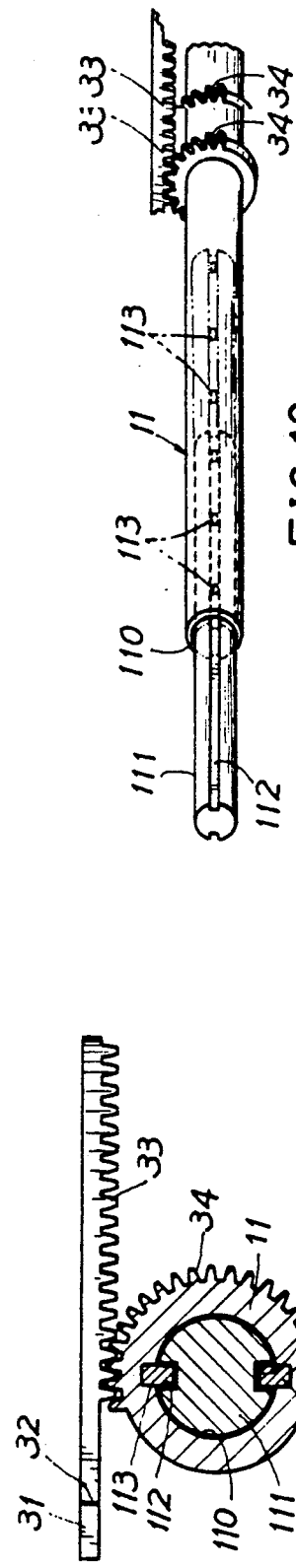
FIG. 2
FIG. 10
FIG. 9

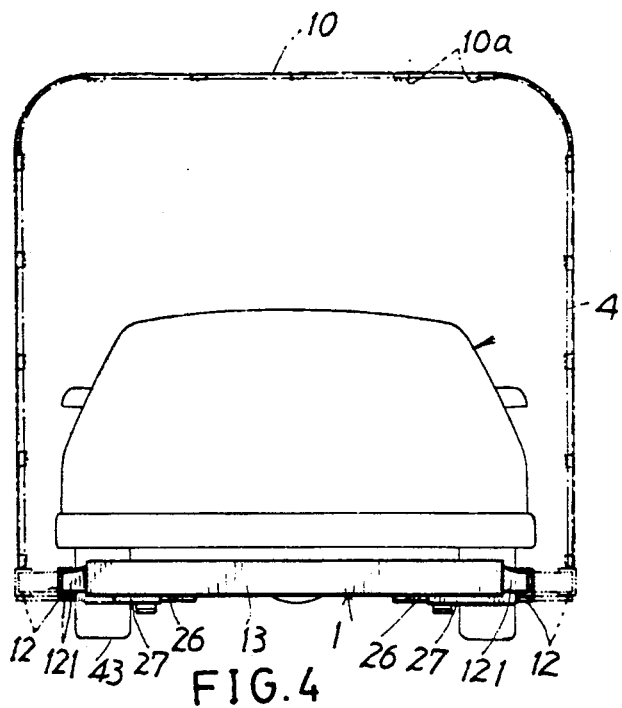
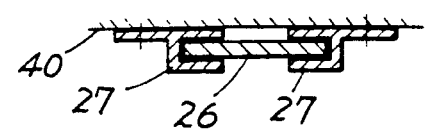
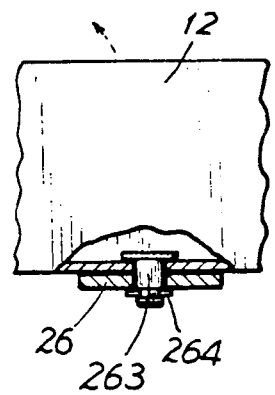
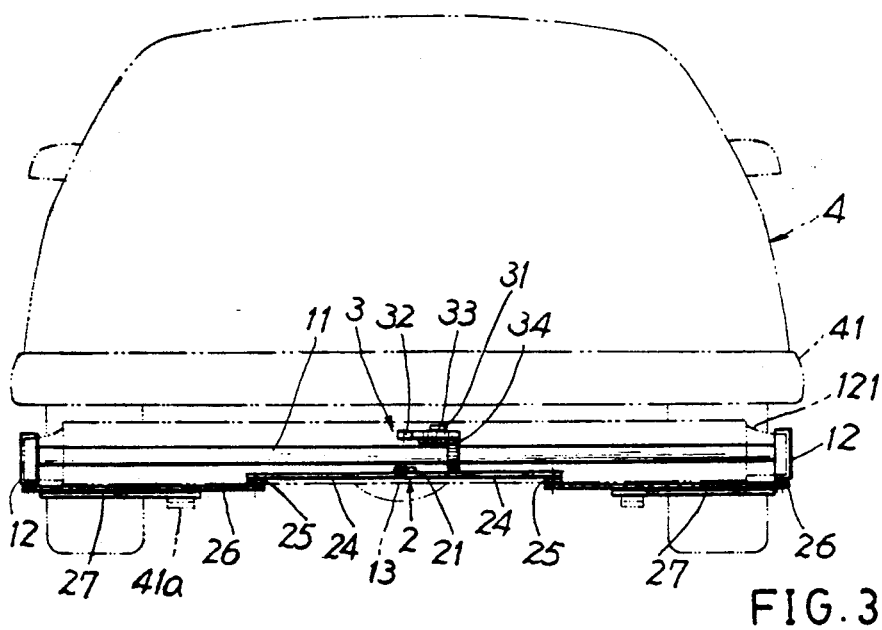
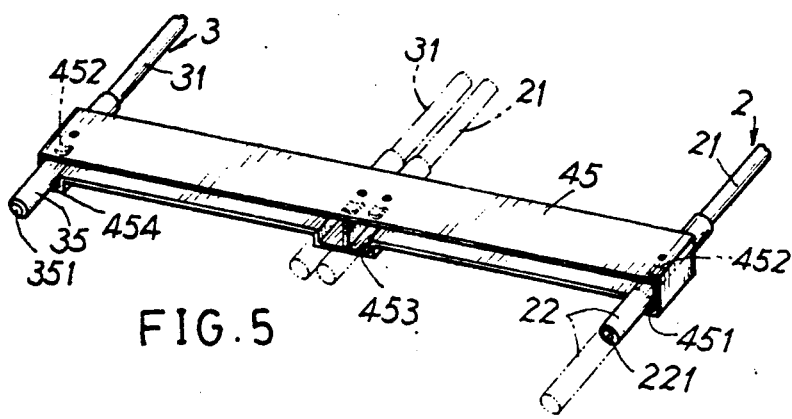
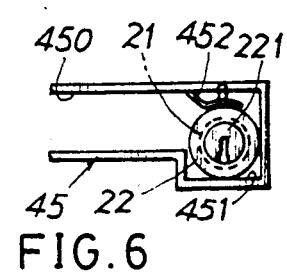

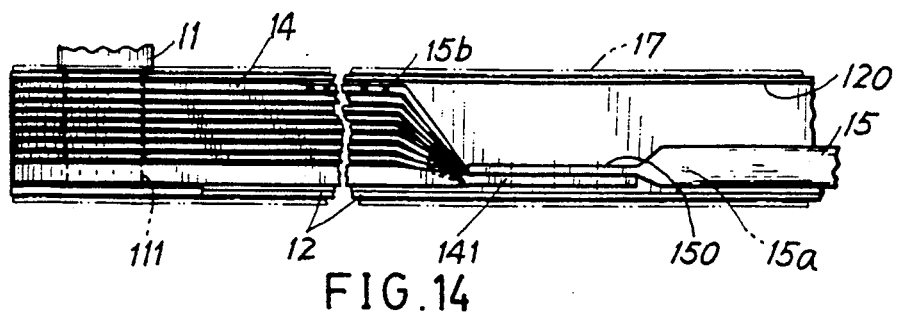
FIG.14
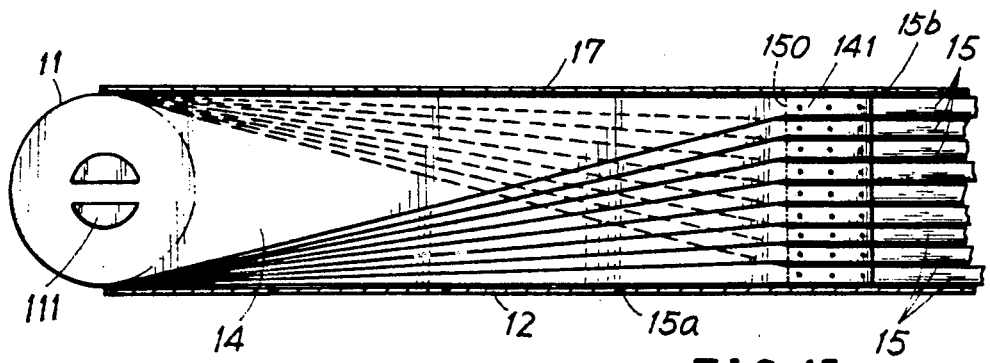
FIG.15
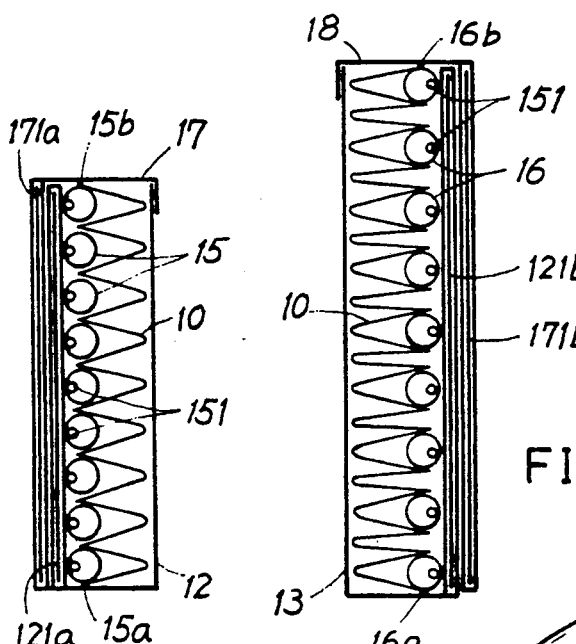
FIG.16
FIG.17
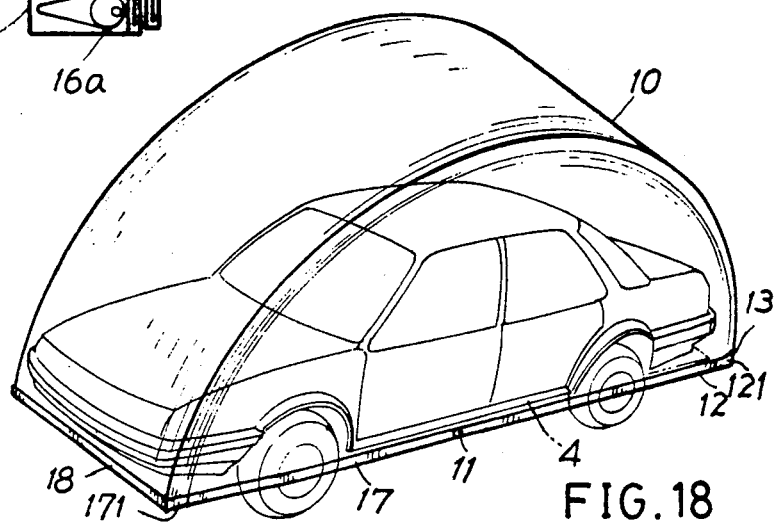
FIG.18

TELESCOPICALLY-OPERATED VEHICLE CANOPY

BACKGROUND OF THE INVENTION

A conventional automobile cover may serve as a sunshade for protecting a car, which however still has the following drawbacks:

1. The automobile cover is opened to cover a car body with a close contact between the car and the cover so that water or moisture may easily penetrate into the cover especially on a rainy day to cause corrosion or rusting or a car.

2. If the car tightly covered with the cover is exposed to a strong sunlight exposure, the hot air within the cover will not be easily dissipated, thereby causing a hot environment uncomfortable for a car driver.

3. The automobile cover, either opened for shielding a car or folded for storage, is quite inconvenient for a car driver or user since it takes a long time to fold or unfold the cover and may even cause a spreading of flying dust when folding or unfolding such a cover.

The present inventor has found the drawbacks of a conventional automobile cover and has invented the present automobile vehicle canopy.

SUMMARY OF THE INVENTION

The object of the present invention is to provide an automatic vehicle canopy including a canopy telescopically and collapsibly stored in a rear bottom portion of a vehicle, which can be quickly extended for shielding a car and also be quickly folded for being stored under a car body, thereby serving as a movable "garage" formed in situ in a car.

BRIEF DESCRIPTION OF THE DRAWINGS

FIG. 2 is a bottom view illustration of the present invention.

FIG. 3 is a rear view illustration of the present invention when folded.

FIG. 4 is a rear view of the present invention also illustrating an extended canopy as shown in dotted line.

FIG. 5 is an illustration showing a front bracket for holding two operating rods of the present invention.

FIG. 6 is a partial front view of a driving rod of the present invention.

FIG. 7 is a sectional drawing showing a slide of a telescopic means of the present invention as viewed from direction 7—7 of FIG. 2.

FIG. 8 is a partial illustration showing the connection between a slide and a side trough of the canopy means of the present invention.

FIG. 9 is a partial sectional drawing of a canopy operating means of the present invention as viewed from 9—9 direction of FIG. 2.

FIG. 10 is a partial perspective view of the canopy operating means of the present invention.

FIG. 14 is a top view showing partial side ribs of the canopy means of the present invention.

FIG. 15 is a side view of the side ribs of the present invention.

FIG. 16 is an illustration showing the side ribs superimposedly formed in a side trough of the present invention.

FIG. 17 shows the rear ribs superimposedly stored in a rear trough of the present invention.

FIG. 18 is a perspective illustration showing an extended canopy of the present invention.

DETAILED DESCRIPTION

As shown in figures, the present invention comprises: a canopy means 1, a telescopic means 2, and a canopy operating means 3, all secured on a vehicle body 4.

Figure 13:
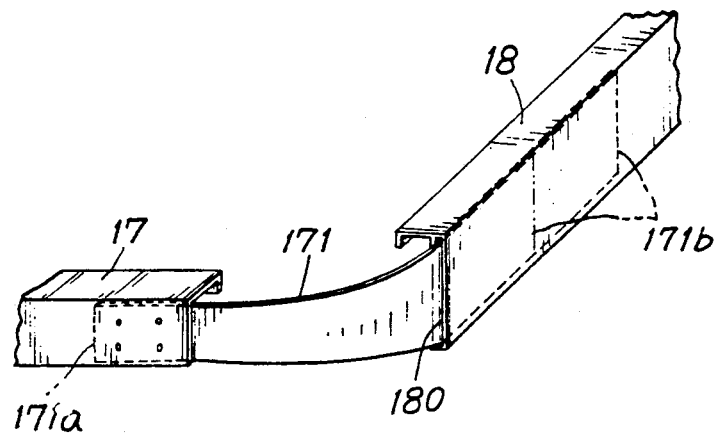
FIG. 13 shows a side upper-cover and a rear upper-cover for covering the side trough and the rear trough respectively in accordance with the present invention.
Figure 12:
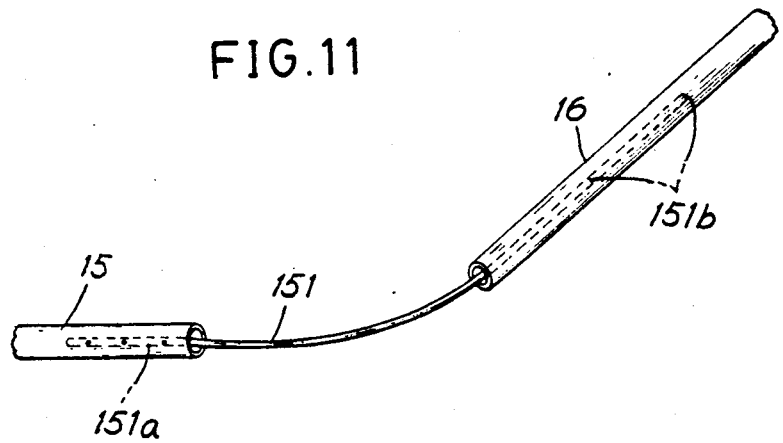
FIG. 12 shows a side and rear ribs of the canopy means of the present invention.

The canopy means 1 includes: a middle axle 11 rotatably mounted on a middle bottom portion 11a a vehicle bottom 40 having a pair of inner shafts 111 telescopically mounted in two opposite sides of the axle 11, a pair of side troughs 12, 12 respectively disposed on right and left sides of the vehicle body 4, a rear trough 13 formed on a rear side of the vehicle body 4, two sets of side ribs 15, each set of side ribs 15 including a plurality of ribs radially secured to either a right or a left inner shaft 111 by means of a plurality of rotatable linking plates 14 and each set of side ribs 15 being superimposedly stored in each side trough 12 as shown in FIGS. 14, 15, and 16, a plurality of rear ribs 16, each rear rib 16 resiliently secured to each pair of side ribs 15 by a pair of spring bars 151 as shown in FIGS. 12, and 16, a pair of side upper covers 17 respectively covering two side troughs 12 as shown in FIG. 16, a rear upper cover 18 secured to the pair of side covers 17 by a pair of outer spring plates 171 as shown in FIG. 13, and a canopy cloth 10 having a plurality of loops 10a for commonly securing the cloth 10 on all the ribs 15, 16.

The middle axle 11 is generally perpendicular to a longitudinal axis A of the vehicle body 4.

Figure 11:
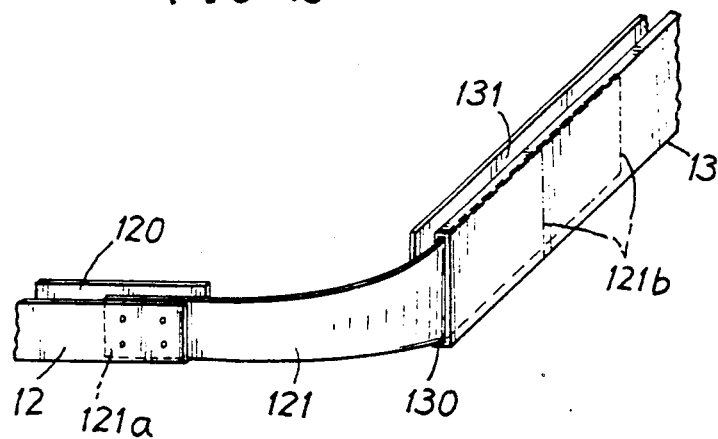
FIG. 11 shows a side trough and a rear trough of the canopy means of the present invention.

The rear trough 13 is secured to a pair of side troughs 12 by a pair of inner spring plates 121 as shown in FIG. 11. One end portion 121a of spring plate 121 is fixed on a rear end portion of side trough 12, whereas the other free end portion 121b of the spring plate 121 is freely embedded in a spring socket 130 to normally resiliently urge the rear trough 13 rearwardly as shown in dotted line of FIGS. 2 and 4. Similarly, one end portion of spring plate 171 is fixed to a rear end portion 171a of side cover 17, whereas the other free end portion 171b of spring plate 171 is freely embedded in a socket 180 of the rear cover 18 to normally resiliently urge the rear cover 18 rearwardly (FIG. 13). The spring bar 151 has one end 151a thereof fixed in the side rib 15 and has another end 151b freely embedded in the rear rib 16 for normally resiliently urging the rear rib 16 rearwardly.

As shown in FIGS. 14, 15, each linking plate 14 is consecutively secured to the inner shaft 111 of the middle axle 11 from a top view thereof (FIG. 14) and each linking plate 14 is projectively radially secured to a circumferential surface of the shaft 111 from a side view thereof (FIG. 15) in that an uppermost plate for securing the uppermost side rib is firmly secured to the inner shaft 111 and the remaining linking plates are rotatably secured to said inner shaft. A linking plates 14 and the connected side ribs 15 are snugly stored in a rib cavity 120 of the side trough 12 when folding the ribs of the present invention. The side ribs 15 are superimposedly stored in trough 12 such that the joint between each rib 15 and plate 14 should be made as thin plate portions 150, 141 as shown in FIG. 14.

The side upper cover 17 is secured to an uppermost side rib 15 by an upper connector 15b and the side trough 12 is secured to a lowermost side rib 15 by a lower connector 15a as shown in FIG. 16. The rear upper cover 18 is secured to an uppermost rear rib 16 by an upper connector 16b and the rear trough 13 is secured to a lowermost rear rib 16 by a lower connector 16a as shown in FIG. 17.

As shown in FIGS. 9, 10, the inner shaft 111 is formed with two longitudinal grooves 112 on its two opposite sides for slidably engaging at least two keys 113 embedded in a hollow cylindrical bore portion 110 so that the inner shaft 111 may be commonly rotated with the axle 11 when driven by gear 34 and rack 33 and the inner shaft 111 may be laterally telescopically slide within the axle 11.

The telescopically means 2 includes: a driving rod 21 pivotally secured to a bottom plate 40 of the vehicle body 4, a pair of transverse links 24 respectively pivotally connected to the driving rod 21, a pair of longitudinal links 25, each link 25 pivotally secured to each transverse link 24 and each link 25 secured with two slides 26 on either a right side or a left side of the vehicle body 4. Each link 24 and link 25 may be designated as a link assembly. Each slide 26 is slidably held in a slide guide 27 fixed on the bottom plate 40 of the vehicle body 4. The outer end portion 261 of the slide 26 is secured to the side trough 12 and the inner end portion 262 is secured to the longitudinal link 25. Two slides 26 are disposed on two sides of a rear tire 43. Each slide 26 is generally perpendicular to a longitudinal axis of the vehicle body 4. The longitudinal link 25 is perpendicular to the two slides 26 of which the inner end portion 262 are connected on two ends of the link 25. The inner pivotal joints 241 of the two links 24 with a rear portion 23 of the driving rod 21 are disposed on two sides of the pivot 231 pivotally securing the rod 21 on the vehicle body 4 proximate to a rear portion 41 of the vehicle 4. A wire 132 is secured between the rear trough 13 and the slide 26 through a loop 132a mounted on the guide 27.

The front portion of the driving rod 21 is resiliently connected with a handle 22 which can be extended frontwardly as shown in dotted line in FIG. 5 and can be depressed rearwardly to be locked by a locking device 221 in a side socket 451 formed in a front bracket 45 secured at a front bottom portion 42 of the vehicle body 4 as retained by a spring plate 452.

The canopy operating means 3 includes: a rotating rod 31 pivotally secured to a middle bottom portion 46 by a pivot 321, an arcuate rack 33 formed on a rear portion 32 of the rod 31, and a gear 34 circumferentially secured on the axle 11 rotatably engageable with the rack 33. A handle 35 is resiliently formed on a front end of the rod 31, which handle 35 can be pulled frontwardly or depressed rearwardly to be locked in the other side socket 454 by a locking device 351.

Figure 1:
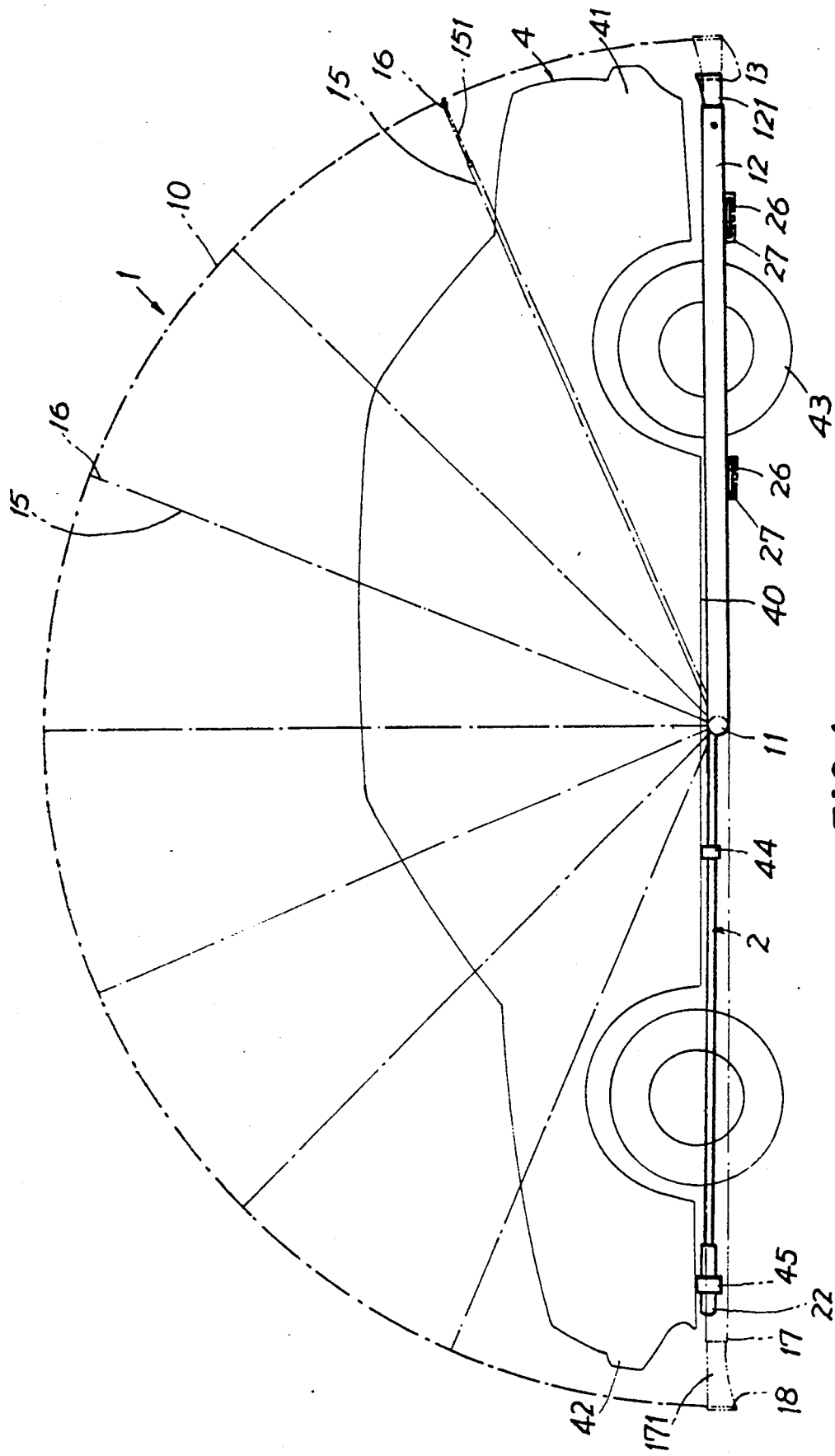
FIG. 1 is an illustration showing a car shielded with the canopy in accordance with the present invention.

Both rods 21, 31 when pulling handles 22, 35 frontwardly can be moved along a channel 450 formed in the front bracket 45. On side sockets 451, 454, both rod handles 22, 35 can be locked therein for retracting the canopy means 1 on a rear bottom portion 41 of the vehicle body 4. The two rods 21, 31 can be moved to a central portion proximate to the longitudinal axis A of the vehicle 4 (FIG. 2) to be locked in a central socket 453 as shown in FIG. 5. Near the middle bottom portion 46, there is provided a middle bracket 44 for slidably holding the two rods 21, 31 thereon as shown in FIGS. 1 and 2.

If for repairing or replacing the tires, the screw 263 locked by spring retainer 264 as shown in FIG. 8 can be dismantled to remove the side trough 12 without obstructing the maintenance work of a car.

In using the present invention for covering the vehicle body 4, the driving rod 21 of the telescopic means 2 is pushed towards the central longitudinal axis A as shown in dotted line of FIG. 2 to drive the two links 24, links 25, and the slides 26 outwardly so as to extend the two side troughs 12 respectively to a right side and a left side of the vehicle. All spring plates 121 and 171, and spring bars 151 will urge the rear trough 13, rear cover 18 and rear ribs 16 rearwardly to separate from the tires 43 and the vehicle body 4. The two inner shafts 111 as secured to the side ribs 15 are also extended outwardly. Now, the rotating rod 31 is moved towards the central axis A to allow the rack 33 to rotate the gear 34, axis 11 and the two shafts 111 in order to extend the ribs 15, 16 and the canopy cloth 10 hanging on the ribs 16 to cover the vehicle 4 as shown in FIGS. 1, 4, 18. Since the two rods 31, 21 can be locked at central socket 453, the canopy means 1 can be stably extended for shielding the vehicle. The two rods 21, 31 are operated generally coplanar to a bottom surface of the vehicle 4. By moving the two rods 21, 31 to their side sockets 451, 454, the canopy means 1 can then be folded to be kept under the bottom portion within a contour of a car body for saving space.

The present invention has the following advantages superior to a conventional automobile cover:

1. The canopy is formed in situ on a bottom of a car to serve like a movable "garage" ready for convenient car shielding or covering purpose. It provides a 24-hours "garage" for well maintaining a car either inside or outside a house. It is especially suitable for a car user without fixed garage.

2. The canopy 1 is first extended to separate from the car to keep a well ventilation of the car body for comfortable driving environment and also for preventing corrosion or rusting especially on a rainy day.

3. For extending or folding the canopy, it is easily quickly operated by merely moving the two rods 21, 31 within about 15 seconds by a single person.

4. The canopy may also shield a precious car which can not be apparently seen by a possible thief. It may bore a car thief when trying to steal a locked car provided with the present invention since the thief must first open the canopy.

The present invention should be positioned heigher than a suspension (spring) system 41a for tires or a gear box to prevent any obstacle influencing the running of a car.

The present invention may be rebuilt on a car. It may be about 60 kgs of its total mass for a car of 2000 cc and it may also be carried on a small car of 1000 cc (up) by proportionally reducing its mass.

I claim:

1. An automatic vehicle canopy comprising:
   a canopy means including a canopy cloth secured on a plurality of ribs normally respectively stored in a pair of side troughs and a rear trough telescopically formed on a rear bottom portion of a vehicle body and retractably positioned under the rear bottom portion within a contour of the vehicle body;

a telescopic means having a driving rod pivotally formed on a bottom portion of said vehicle body for operatively extending said telescopic means and said canopy means horizontally outwardly to separate said telescopic means and said canopy means from the vehicle body, and for operatively retracting the canopy means inwardly to be positioned under the bottom portion of said vehicle body; and a canopy operating means having a rotating rod pivotally formed on a middle bottom portion of said vehicle body for operatively extending said canopy cloth of said canopy means for shielding said vehicle body, and for folding said canopy means towards the rear bottom portion of said vehicle body.

2. An automatic vehicle canopy according to claim 1, wherein said canopy means further includes: a middle axle generally perpendicular to a longitudinal axis of said vehicle body rotatably mounted on the middle bottom portion of said vehicle body having a pair of inner shafts telescopically mounted in two opposite sides of said axle, the pair of said side troughs respectively disposed on right and left sides of a rear portion of said vehicle body, the rear trough formed on a rear side of said vehicle body resiliently secured to both said side troughs by a pair of inner spring plates, two sets of side ribs, each set of side ribs including a plurality of side ribs radially secured to either a right inner shaft or a left inner shaft of said axle and normally superimposedly stored in each said side trough, a plurality of rear ribs having a same number of each set of said side ribs, each said rear rib resiliently secured to each respective said side rib by a spring bar, a pair of side upper covers respectively covering two said side troughs, a rear upper cover resiliently secured to two said side covers by a pair of outer spring plates for covering said rear trough, and said canopy cloth commonly secured to said side ribs and said rear ribs, said side ribs being operatively extended for opening the canopy cloth upon a rotation of said inner shafts.

3. An automatic vehicle canopy according to claim 2, wherein an uppermost side rib is firmly secured to one said inner shaft by an uppermost linking plate fixedly secured to one said inner shaft, and all remaining linking plates on one side of the vehicle being rotatably secured to one said inner shaft.

4. An automatic vehicle canopy according to claim 2, wherein each said side upper cover is secured to an uppermost side rib and each said side trough is secured to a lowermost side rib.

5. An automatic vehicle canopy according to claim 2, wherein said rear upper cover is secured to an uppermost rear rib and said rear trough is secured to a lowermost rear rib.

6. An automatic vehicle canopy according to claim 2, wherein one spring end of one outer spring plate is fixed to one said upper side cover, and another spring end of said one outer spring plate is slidably embedded in said rear upper cover so that said spring plate will urge and extend the rear cover when extending the canopy means.

7. An automatic vehicle canopy according to claim 2, wherein one spring end of one inner spring plate is fixed to one said side trough, and another spring end of said one inner spring plate is slidably embedded in said rear trough so that said spring plate will urge and extend the rear trough when extending the canopy means.

8. An automatic vehicle canopy according to claim 2, wherein each said spring bar has one end thereof fixed to one said side rib and has another end of each said spring bar slidably inserted in one said rear rib so that each said spring bar will urge and extend said rear rib for hanging the canopy cloth when extending the canopy means.

9. An automatic vehicle canopy according to claim 2, wherein each said inner shaft is coupled with said middle axle by a plurality of keys to allow a lateral telescopic movement of each said inner shaft in said axle and to allow a common rotation of each said shaft and said axle as driven by said rotating rod of said canopy operating means for extending, raising, and opening the secured canopy cloth.

10. An automatic vehicle canopy according to claim 1, wherein said telescopic means further includes: the driving rod pivotally secured to said rear bottom portion of said vehicle body by a pivot, a pair of link assemblies pivotally secured to a rear portion of said driving rod disposed on front and rear sides of said pivot, two pairs of slides, each pair of said slides pivotally secured to each said link assembly, respectively, and slidably held in a pair of slide guides secured on said rear bottom portion of said vehicle body, two said slides secured to each said side trough, whereby upon a pushing of said driving rod from a side socket of a front bracket formed on a front portion of said bottom portion of said vehicle body towards a central socket of said front bracket, said link assemblies and two pairs of said slides will be driven horizontally outwardly to move said troughs outwardly to separate from the vehicle body to a desired distance.

11. An automatic vehicle canopy according to claim 10, wherein said driving rod of said telescopic means includes a handle formed on a front end of said driving rod lockable on one of said side socket and said central socket of said front bracket.

12. An automatic vehicle canopy according to claim 10, wherein said rear trough is also secured to one said slide of said telescopic means by a wire secured therebetween for limiting an extension distance of said rear trough and for recovering said rear trough when retracted.

13. An automatic vehicle canopy according to claim 10, wherein each said slide is slidably held in the slide guide generally perpendicular to a longitudinal axis of said vehicle body.

14. An automatic vehicle canopy according to claim 10, wherein a screw having a spring retainer is provided for detachably securing said side trough to one said slide of said canopy means.

15. An automatic vehicle canopy according to claim 1, wherein said canopy operating means further includes: said rotating rod pivotally secured to the middle bottom portion of said vehicle bottom portion, an arcuate rack formed on a rear portion of said rotating rod, and a gear circumferentially formed on said middle axle rotatably engageable with said rack, whereby upon a pushing of said rotating rod from a second side socket formed on a front bracket towards a central socket, and gear is rotated by said rack to rotate said axle and extend said ribs and canopy cloth for shielding said vehicle body.

16. An automatic vehicle canopy according to claim 15, wherein said rotating rod is formed with a second handle on a front end thereof lockably held in one of said second side socket and said central socket of said front bracket.

* * * * *